July 29, 1952  W. T. STEPHENS  2,605,108
RELIEF VALVE
Filed July 12, 1946  2 SHEETS—SHEET 1
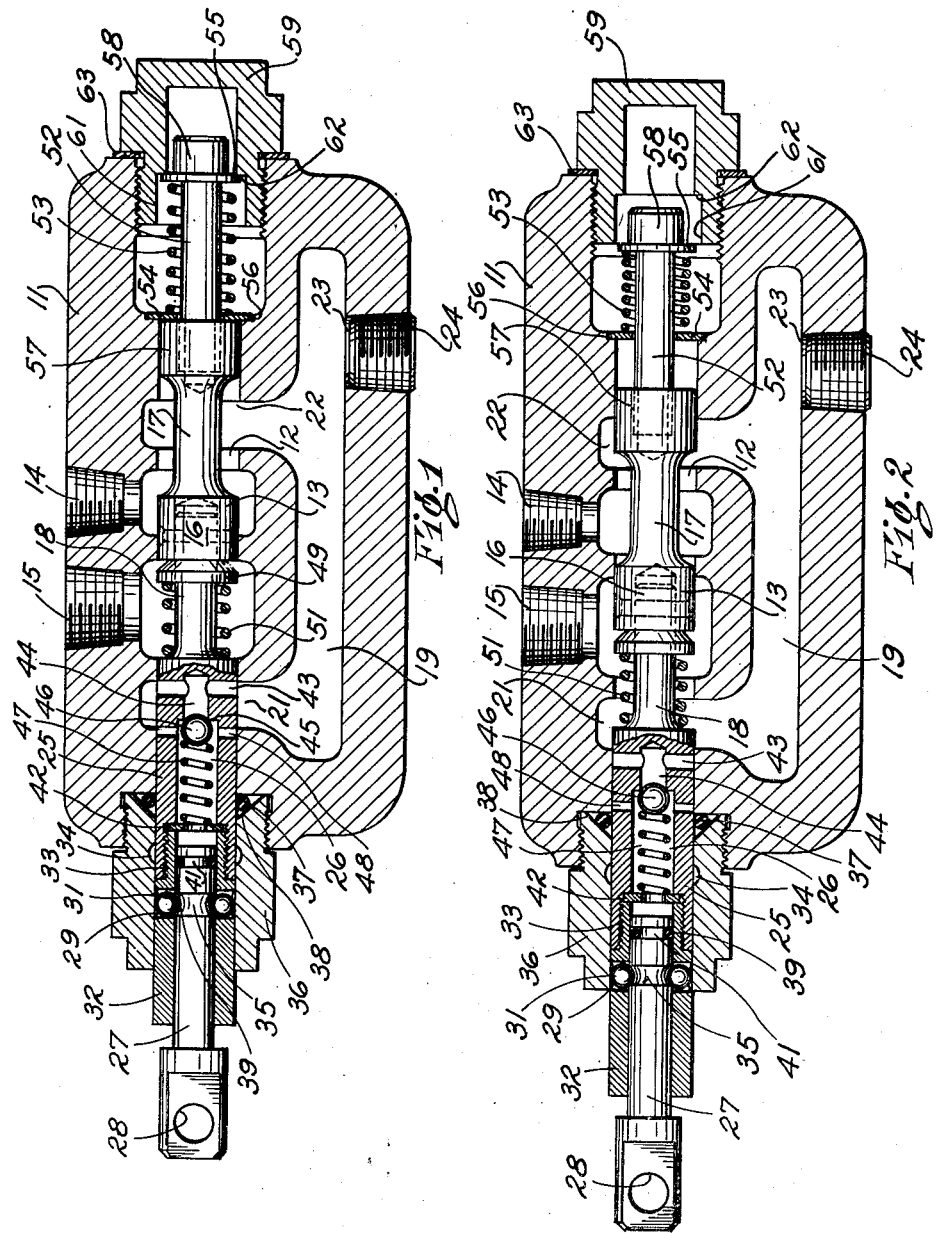
INVENTOR.
WILLIAM T. STEPHENS
BY Frederic B. Schramm
ATTORNEYS July 29, 1952　　　W. T. STEPHENS　　　2,605,108
RELIEF VALVE
Filed July 12, 1946　　　　　　　　　　　2 SHEETS—SHEET 2
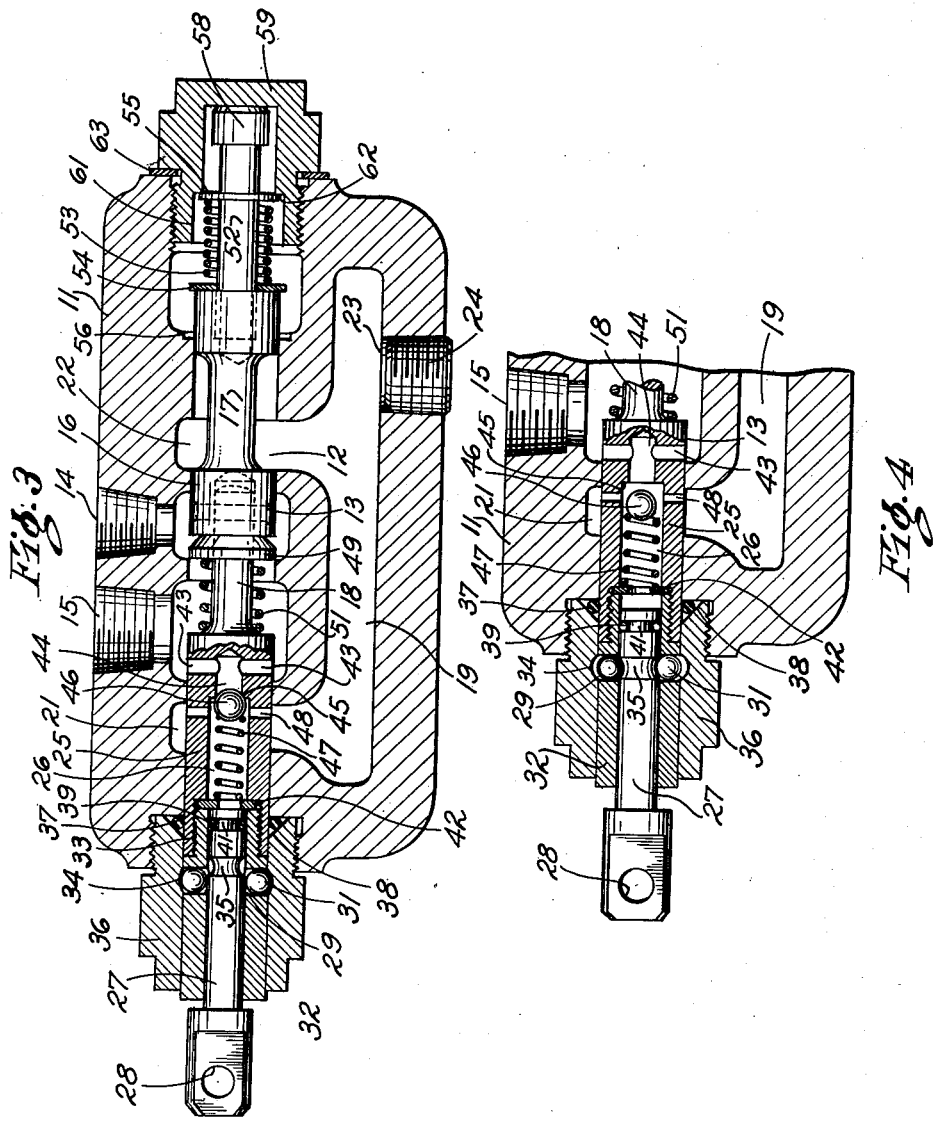
INVENTOR.
WILLIAM T. STEPHENS
BY Frederic B. Schramm
ATTORNEYS Patented July 29, 1952

2,605,108

UNITED STATES PATENT OFFICE 2,605,108

RELIEF VALVE

William T. Stephens, Painesville, Ohio

Application July 12, 1946, Serial No. 683,099

8 Claims. (Cl. 277—55)

My invention relates to the control of fluid flow and is concerned particularly with sliding plunger valves.

It is an object of my invention to provide an improved detent valve and to apply power continuously to an hydraulic operator without being obliged to hold a control valve in the power position.

A further object of the invention is to provide means for relieving a fluid control valve from the power position when the pressure attains a predetermined value or when an hydraulic operator reaches the end of its stroke.

A further object of the invention is to provide a sliding plunger type control valve with a relief valve for releasing the plunger from a predetermined position in response to pressure.

A further object is to provide a detent in the plunger of a slide valve.

Still another object of the invention is to lock an hydraulic operator valve in a power position until a relief valve is operated.

Other and further objects, features and advantages of the invention will become apparent as the description proceeds.

In carrying out my invention in accordance with a preferred form thereof, I provide a body with inlet and outlet ports and a bore for receiving a sliding plunger for closing or opening passage between the ports and having an end portion formed as a sleeve adapted to receive a stem for moving the sleeve longitudinally to move the valve plunger to open or closed positions. The sleeve is provided with a radial opening adapted to receive a movable locking member. The sleeve is so arranged that alternatively the stem is locked in position with respect thereto by the locking member or the sleeve is locked in the bore of the valve body. Grooves are formed in the bore and in the stem so that the sleeve is locked either in the position in which the radial opening is in alignment with the groove in the bore or in the position in which the opening is in alignment with the groove in the stem. Moreover, the sleeve may be unlocked when both the grooves are brought into alignment with the radial opening in the sleeve.

A better understanding of the invention will be afforded by the following detailed description considered in conjunction with the accompanying drawing, in which Fig. 1 is a longitudinal, medial, sectional view of a fluid controlled valve forming an embodiment of my invention, showing the valve in the neutral position;

Fig. 2 is a view corresponding to Fig. 1, showing the valve with its plunger in the power releasing position;

Fig. 3 is a corresponding view, showing the valve with its plunger locked in the power applying position; and Fig. 4 is a corresponding fragmentary view, showing the manner in which the valve plunger is released from the power position.

Like reference characters are utilized throughout the drawing to designate like parts.

The valve illustrated and described by way of example comprises a valve body 11 having a longitudinal bore 12 adapted to receive a valve plunger 13. Inlet passageway 14 and a fluid conducting passageway 15 are formed in the body 11, each intersecting the bore 12. The inlet passageway 14 is provided with a threaded opening or port adapted to be connected to a pipe leading from the source of fluid pressure such as oil pump, for example. The passageway or port 15 is provided with a threaded opening adapted to be connected to a pipe leading to a hydraulic work cylinder or the like, the application of power to which is to be controlled by the valve illustrated. When fluid is passing from the pressure source to the cylinder passageway 15 is an outlet passageway, but under certain conditions motion of the piston in the work cylinder may force fluid through passageway 15 into the valve. The plunger 13 is formed with a full diameter portion 16 adapted to occupy the portion of the bore 12 between the passageways 14 and 15 when the plunger 13 is in its neutral position for locking the hydraulic operator, or the like, in position and preventing the flow of fluid pressure thereto from the inlet 14. The plunger 13 is also provided with reduced diameter or neck portions 17 and 18 on either side of the full diameter portion 16.

A chamber 19 is formed in the body 11 having portions 21 and 22 intersecting the bore 12 and preferably an opening 23 which may be closed by a plug 24 or connected by a pipe, not shown, to a sump or to an additional valve connected in tandem for controlling the flow of fluid pressure from the inlet 14 to an additional independently controlled operator, not shown.

The left-hand end 25 of the plunger 13 is preferably made hollow with a bore 26 to form a sleeve. The sleeve portion 25 of the plunger 13 protrudes from the left-hand end of the valve body 11 for connection to an operating arm, link, or the like. Instead of connecting such a member directly to the portion 25 of the plunger 13, a stem 27 is provided having an eye 28 adapted to be joined by a connecting pin to a yoke of a connecting link or lever, not shown. The stem 27 is slidable in the bore 26 of the sleeve 25, and the sleeve 25 is provided with one or more radial openings 29 for receiving locking members 31, preferably spherical in form. Although the end portion 32 of the sleeve 25 may be integral therewith, preferably it is formed as a separate member and joined to the remainder of the sleeve portion 25 by suitable fastening, such as a threaded joint 33.

In order to lock the sleeve 25 in a position relative to either the valve body 11 or the stem 27 the valve body 11 may be provided with a peripheral groove 34 within its bore and the stem 27 is provided with a peripheral groove 35. To facilitate assembly operations, however, a separate bushing 36 is preferably provided in which the groove 34 is formed. The bushing is threaded into the end of the valve body 11, is provided with a fluid seal therewith comprising a resilient gasket 37 and is compressed by a suitable conical seat formation 38. The stem 27 is also provided with a suitable pressure type fluid seal which may take the form of an O-ring in a peripheral groove 41 formed at the inner end of the stem 27. A motion-limiting washer 42 is provided at the inner end of the threaded joint 33 between the portion 32 of the sleeve and the remaining portion 25 thereof.

Radial openings 43 are formed in the sleeve 25 communicating with the bore 26 through a reduced diameter portion of the bore 44 forming a seat 45 for a ball-check 46. Preferably a compression spring 47 is provided which lies between the washer 42 and the ball-check 46 so as to form a relief valve. Radial openings 48 are also provided in the sleeve 25, which are relatively small in comparison with the openings 43.

Preferably a disc or cone type check valve 49 is mounted on the neck portion 18 of the plunger 13 and biased by means of a spring 51 toward the center full diameter portion 16 of the plunger 13. The check valve 49 may be of the type described more in detail in my co-pending application for a control valve, Serial No. 631,587, filed November 29, 1945, now Patent No. 2,600,702.

Preferably also as described in my aforesaid co-pending application the plunger 13 is provided with an end stem 52 carrying a compression spring 53 adapted to bear against washers 54 and 55, respectively, for biasing the plunger 13 to the neutral position illustrated. For limiting the leftward motion of the washer 54 an annular recess 56 is cut in the valve body 11. The washer 54 has an outer diameter greater than the diameter of the bore 12 and an inner diameter less than the diameter of the spring 53. The stem 52 is provided with a head 58 for retaining the washer 55; and a cap 59 having a bore 61 and a shoulder 62 is provided for limiting the rightward motion of the washer 55. It will be understood that the cap 59 is sealed to the valve body 11 by suitable gasket means 63.

When the plunger 13 is in the neutral position, illustrated in Fig. 1, fluid pressure coming through the inlet passageway 14 is cut off from the passageway 15 so that no pressure is applied to the device controlled by the valve. Furthermore, the portions of the bore 12 on either side of the passageway 15 are closed so that no fluid pressure can return from the passageway 15 and the hydraulic operator, or the like, connected thereto is locked in position. However, fluid from the inlet passageway 14 is free to enter the chamber 19. Such fluid would be free to flow to a sump which might be connected to the opening 23 if the screw plug 24 were removed. Alternatively, such fluid could flow to one or more additional valves which might have inlet openings connected to the chamber outlet opening 23, in case more than one device were to be operated by fluid pressure received through the inlet 14.

If it is desired to relieve or unlock the device connected to the passageway 15 the stem 27 may be moved to the left thereby moving the plunger 13 to the position illustrated in Fig. 2. This will draw the sleeve portions 32 and 25 to the left inasmuch as the spherical check member 31 is locked between the bore of the bushing and the groove 35 in the stem 27. Communication is now established between passageway 15 and chamber 19 and between said chamber and inlet passageway 14. Thus if chamber 19 is plugged, the oil pressure motor may be turned off and the work cylinder unlocked by communication between the passageways 14 and 15 without check valve action. Of course if chamber 19 is connected to the sump the motor need not be turned off. As soon as the stem 27 is released, the spring 53 restores the plunger 13 to its neutral position as in Fig. 1.

When it is desired to apply pressure to the device connected to the passageway 15 and produce positive action thereof, preventing any backslip, the plunger 13 is moved to the right toward the position shown in Fig. 3, by pushing the stem 27 inward to the right. This brings the check valve 49 into the portion of the bore 12 between the passageways 14 and 15 so that fluid pressure from the passageway 14 is free to enter the passageway 15 by lifting the check valve member 49 against the pressure of the spring 51. The fluid pressure cannot, however, return from the passageway 15 to the passageway 14 in the event of momentary failure of inlet pressure by reason of the action of the check valve member 49. It is unnecessary to hold the stem 27 in the position illustrated for the reason that when the stem 27 was pushed inward the radial openings 29 in the sleeve 25 were brought into alignment also with the groove 34 in the bushing 36. Consequently, the stem 27 was free to move inward to the position illustrated in Fig. 3. The spherical locking members 31 were thereby forced outward into the groove 34 and prevented from moving inward so that the sleeve 25 is locked in the power position, namely, the position illustrated in Fig. 3 whereby pressure from the inlet 14 continues to flow into the passageway 15 for continuing the stroke of a device such as an operating cylinder which may be connected to the passageway 15. When such an hydraulic operator, however, reaches the end of its stroke, the pressure therein may become excessive. To prevent such an occurrence, I have provided the relief arrangement hereinbefore described. Excessive pressure, entering the radial passageway 43, lifts the ball-check 46 from its seat 45 and admits fluid pressure to the bore 26 of the sleeve 25. The pressure applied to the inner end of the stem 27 accordingly forces it outward so as to permit the spherical check members 31 to drop back again into the groove 35, as illustrated in Fig. 4, whereby the sleeve 25 is free to move outward to the left. The openings 48 are so small that the back pressure is sufficient to push out the plunger 27. The compressed spring 53 then pushes the plunger 13 to the left until it is restored to the neutral position illustrated in Fig. 1.

When the plunger 13 is in the power position represented in Fig. 3, the chamber 19 is not subjected to inlet pressure unless the relief valve 46 opens, whereupon a passageway is formed through the openings 43, 44 and 48. This allows the fluid to release into the low pressure return in the event of sticking of the plunger 27 or failure of the plunger return spring 53. When the plunger 13 is in the position of Fig. 2, both openings 43 and 48 are covered.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

I claim:

1. A valve comprising in combination a body having a bore with inlet and outlet passageways intersecting said bore and a plunger slidable in said bore movable into and away from the portion thereof between said passageway intersections for either opening or closing communication between said passageways, said plunger having a hollow end in the form of a sleeve and having a movable operating stem mounted within said sleeve, said sleeve having a radial opening containing a movable locking member, said stem having a peripheral groove adapted to cooperate with said locking member and to lock said stem in a position in alignment with said radial opening, said bore also having a peripheral groove adapted to receive said locking member when the sleeve is in a predetermined position for releasing the stem from a locked position in said sleeve and locking the sleeve in a predetermined position in the valve body.

2. In a fluid pressure control device, an operating plunger, and a bushing therefor, said plunger including a slidable sleeve for operating the plunger and a stem slidable in said sleeve for longitudinally moving said plunger, said sleeve having a radial opening for receiving a movable locking member, said stem and said bushing having grooves for locking said sleeve in a relative position with said radial opening in alignment with one of said grooves, said sleeves also having a passageway for admitting pressure thereto, a resiliently closed relief valve for closing said passageway, and said stem having a fluid seal in said sleeve, whereby pressure, admitted through said passageway with sufficient magnitude to open the relief valve, drives said stem longitudinally to bring both grooves in alignment and unlock the sleeve from the position in which its radial opening is locked in alignment with the groove in said bushing.

3. In a slide valve, a ported valve body, a plunger slidable in said body for opening and closing the valve ports, said plunger including a sleeve slidable in a portion of said valve body for operating the plunger, a stem slidable in said sleeve for longitudinally moving said stem and plunger, said sleeve having a radial opening for receiving a movable locking member, and said stem and valve body portion each having a groove for receiving a portion of said locking member, said locking member locking said stem and sleeve together when said stem is disposed with its groove aligned with said locking member, said locking member locking said sleeve and body portion together when said sleeve is disposed with the locking member aligned with the groove in said valve body portion and the stem is disposed with its groove displaced from said locking member.

4. In a slide valve, a ported valve body, a plunger slidable in said body for opening and closing the valve ports, said plunger including a sleeve slidable in a portion of said valve body for operating the plunger, a stem slidable in said sleeve for longitudinally moving said stem and plunger, said sleeve having a radial opening for receiving a movable locking member, and said stem and valve body portion each having a groove for receiving a portion of said locking member, said locking member locking said stem and sleeve together when said stem is disposed with its groove aligned with said locking member, said locking member locking said sleeve and body portion together when said sleeve is disposed with the locking member aligned with the groove in said valve body portion and the stem is disposed with its groove displaced from said locking member, said sleeve having a passageway communicating with a port in said valve body for directing fluid under pressure to said stem.

5. In a slide valve, a ported valve body, a plunger slidable in said body for opening and closing the valve ports, said plunger being connected with an extension member slidable in a portion of said valve body for operating the plunger, an operating member slidably mounted in said extension member for longitudinally moving said plunger, one of said members having a radial opening for receiving a movable locking device, the other of said members and the valve body portion each having a groove for receiving a portion of said locking member, said locking device locking said members together when they are disposed with the groove in said one member aligned with said locking device, said locking device locking said plunger extension member and body portion together when said extension member is disposed with the locking member aligned with the groove in said valve body portion and the stem disposed with its groove displaced from said locking member.

6. In a slide valve, a ported valve body, means slidable in said body comprising a plunger for opening and closing the valve ports and an extension member connected with said plunger and slidable in said valve body, a stem member slidably mounted by said extension member for longitudinally moving said extension member and plunger, detent means in said stem and extension members for locking said members together when said members are disposed in a first relative position so that they may slide together in said body, detent means in said body, said body and extension member detent means locking said extension member and body together when their respective detent means are aligned and when said stem and extension members are disposed in a second relative position, and a port in said slidable means leading from a port in said valve body to a face of said stem member for moving said stem member relative to said extension member from said second relative position to said first relative position in response to fluid pressure in said valve, in order to unlock said extension member from said body and lock together said extension member and stem member.

7. A valve comprising in combination a body having a bore, fluid inlet and work cylinder passageways intersecting said bore, a chamber having extensions intersecting said bore on either side of said passageways, a plunger slidable in said bore, said plunger having full diameter portions filling the bore and reduced diameter portions therebetween, said plunger portions and bore intersections being so spaced relative to one another that when the plunger is in a neutral position, full-diameter portions of the plunger block said work cylinder passageway from communication with said inlet passageway and with one of said chamber extensions and communication is established between said fluid inlet passageway and the other one of said chamber extensions, and when the plunger is displaced from neutral in one direction communication from said inlet to said work cylinder passageway is established and full-diameter plunger portions are disposed so as to block said chamber extensions from said passageways, and when the plunger is displaced in the opposite direction from neutral communication is established between said passageways by way of said chamber extensions and said chamber.

8. A valve comprising in combination a body having a bore, fluid inlet and work cylinder passageways intersecting said bore, a chamber having extensions intersecting said bore on either side of said passageways, a plunger slidable in said bore, said plunger having full-diameter portions filling the bore and reduced-diameter portions therebetween, said plunger portions and bore intersections being so spaced relative to one another that when the plunger is in a neutral position, full-diameter portions of the plunger block said work cylinder passageway from communication with said inlet passageway and with one of said chamber extensions and communication is established between said fluid inlet passageway and the other one of said chamber extensions, and when the plunger is displaced from neutral in one direction communication from said inlet to said work cylinder passageway is established and full diameter plunger portions are disposed so as to block said chamber extensions from said passageways, and when the plunger is displaced in the opposite direction from neutral communication is established between said passageways by way of the other of said chamber extensions and said chamber, and a third passageway in communication with said chamber that may form an outlet passageway for connection to another element.

WILLIAM T. STEPHENS.

REFERENCES CITED

The following references are of record in the file of this patent:

UNITED STATES PATENTS

| Number | Name | Date |
|---|---|---|
| 2,276,979 | Jacobi | Mar. 17, 1942 |
| 2,289,567 | Berglund | July 14, 1942 |
| 2,396,643 | Ganahl | Mar. 19, 1946 |
| 2,475,298 | Sloane | July 5, 1949 |
| 2,486,087 | Wright | Oct. 25, 1949 |